(12) United States Patent
Boyington

(10) Patent No.: US 8,485,207 B1
(45) Date of Patent: Jul. 16, 2013

(54) SHADE SYSTEM FOR VEHICLES

(76) Inventor: Eric J. Boyington, Stockton, AL (US)

( * ) Notice: Subject to any disclaimer, the term of this patent is extended or adjusted under 35 U.S.C. 154(b) by 0 days.

(21) Appl. No.: 13/293,492

(22) Filed: Nov. 10, 2011

(51) Int. Cl.
*E04H 15/06* (2006.01)
*B60R 9/00* (2006.01)

(52) U.S. Cl.
USPC ....... 135/88.08; 135/88.13; 135/16; 280/505; 280/491.1; 224/519

(58) Field of Classification Search
USPC .......... 135/88.01, 88.05, 88.07–88.09, 88.13, 135/88.15–88.16, 16; 296/152, 163, 136.12; 280/491.5, 504–505; 108/44, 50.12; 224/521
See application file for complete search history.

(56) References Cited

U.S. PATENT DOCUMENTS

| | | |
|---|---|---|
| D306,093 S | 2/1990 | Lerch |
| 5,857,741 A | 1/1999 | Anderson |
| 6,082,269 A | 7/2000 | Padberg |
| 6,189,458 B1 | 2/2001 | Rivera |
| 6,511,088 B2 | 1/2003 | Kahlstorf |
| 6,722,380 B1 | 4/2004 | Hafer |

*Primary Examiner* — Winnie Yip

(57) ABSTRACT

A shade system having a main shaft with a first and second end, the second end adapted to engage a hitch receiver on a vehicle, a first and second half are connected via a pivot component allowing the first half to pivot from side to side, a telescopic arm in the first end secured in a desired position via a locking mechanism, a vertical shaft extending upwardly from the telescopic arm wherein an umbrella holder is adapted to receive an umbrella shaft of an umbrella which can slide up and down through the umbrella holder and is secured in a position via a locking mechanism, a barrier bar extending outwardly at the pivot component adapted to prevent the first half from pivoting too far to the side, and a flange extending downwardly from the main shaft, wherein a hitch ball is disposed on the flange.

5 Claims, 5 Drawing Sheets

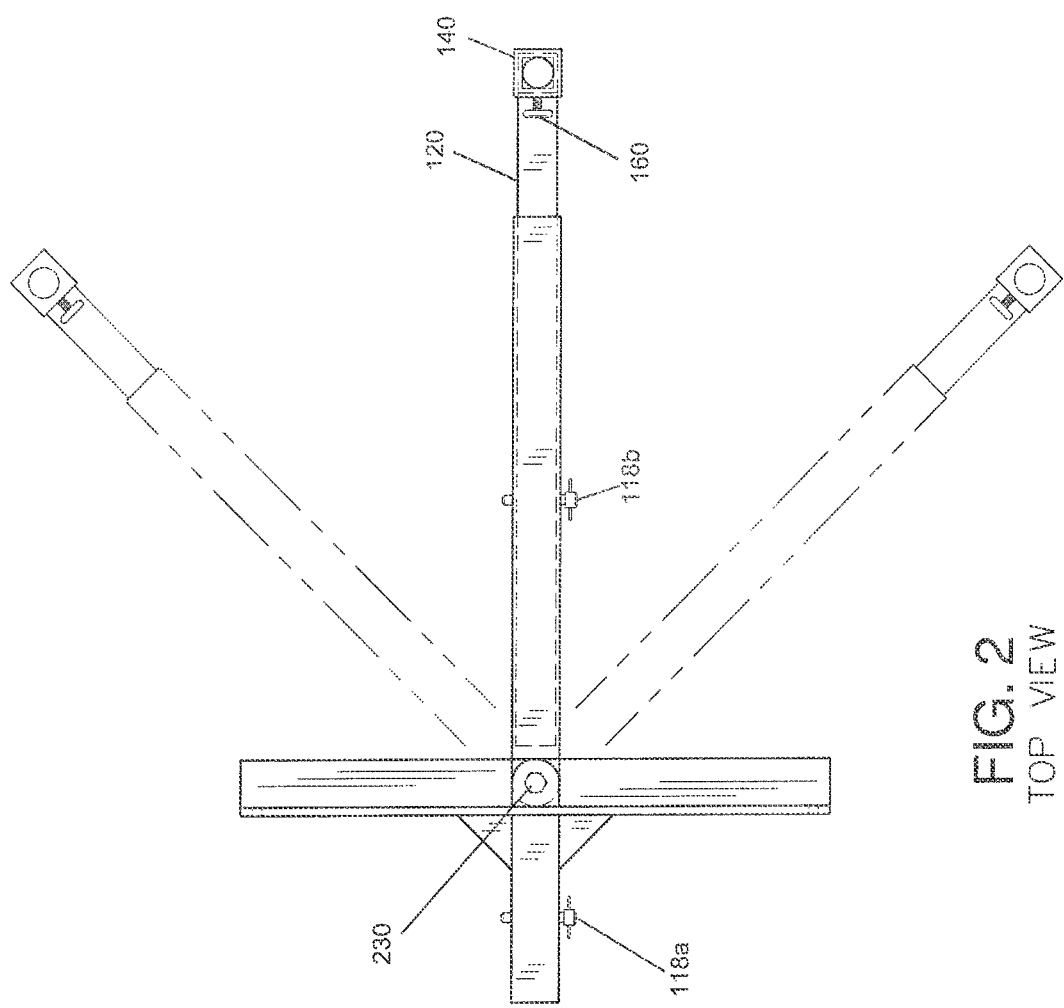

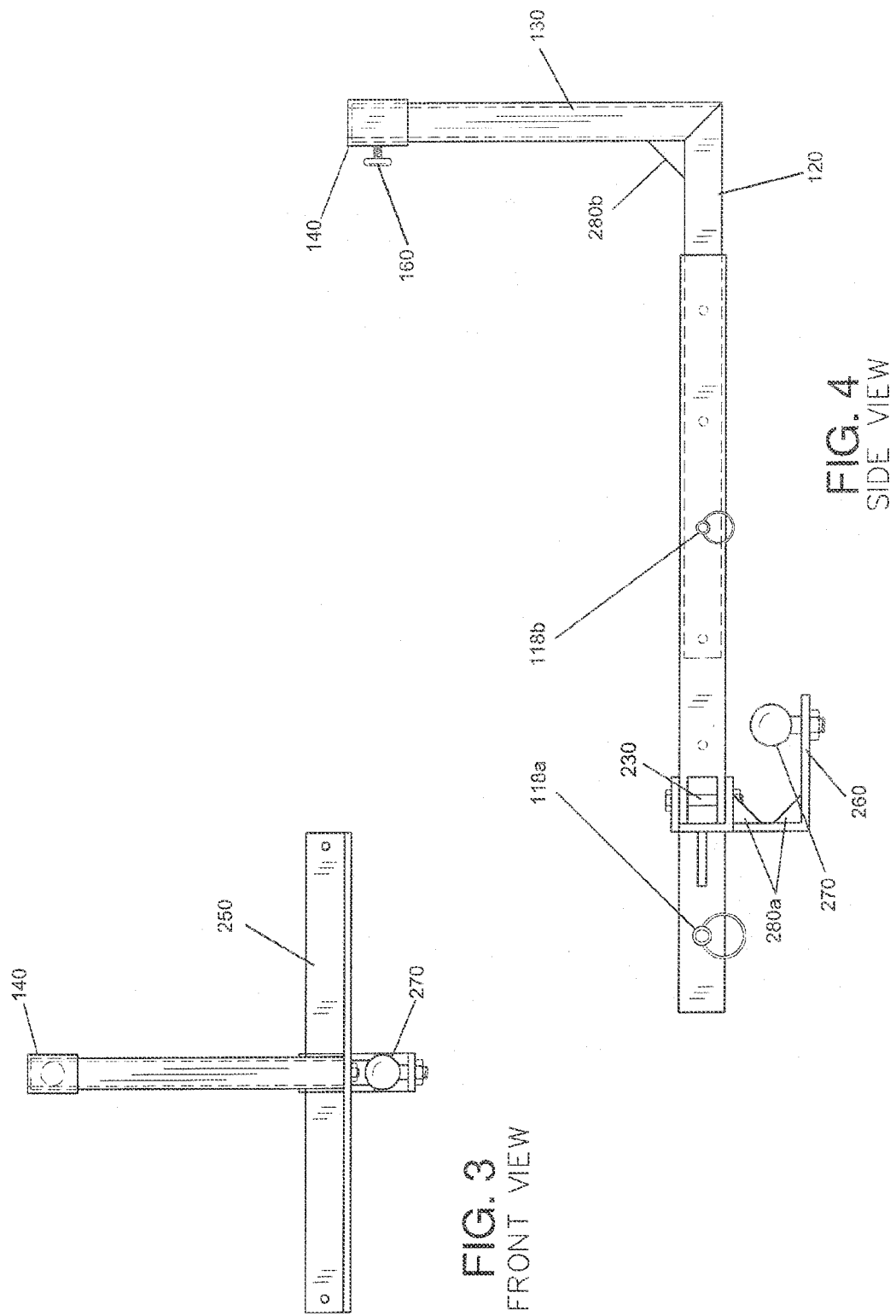

SHADE SYSTEM FOR VEHICLES

FIELD OF THE INVENTION

The present invention is directed to a portable shade system for vehicles for providing shade or cover during inclement weather.

BACKGROUND OF THE INVENTION

It can sometimes be difficult to find shaded areas when outside. The present invention features a shade system for installing in a vehicle's trailer hitch. The system can help make working or spending time outdoors more comfortable and enjoyable.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 2 is a top view of the system of the present invention.

FIG. 3 is a front view of the system of the present invention.

FIG. 4 is a side view of the system of the present invention.

DESCRIPTION OF PREFERRED EMBODIMENTS

Figure 1:
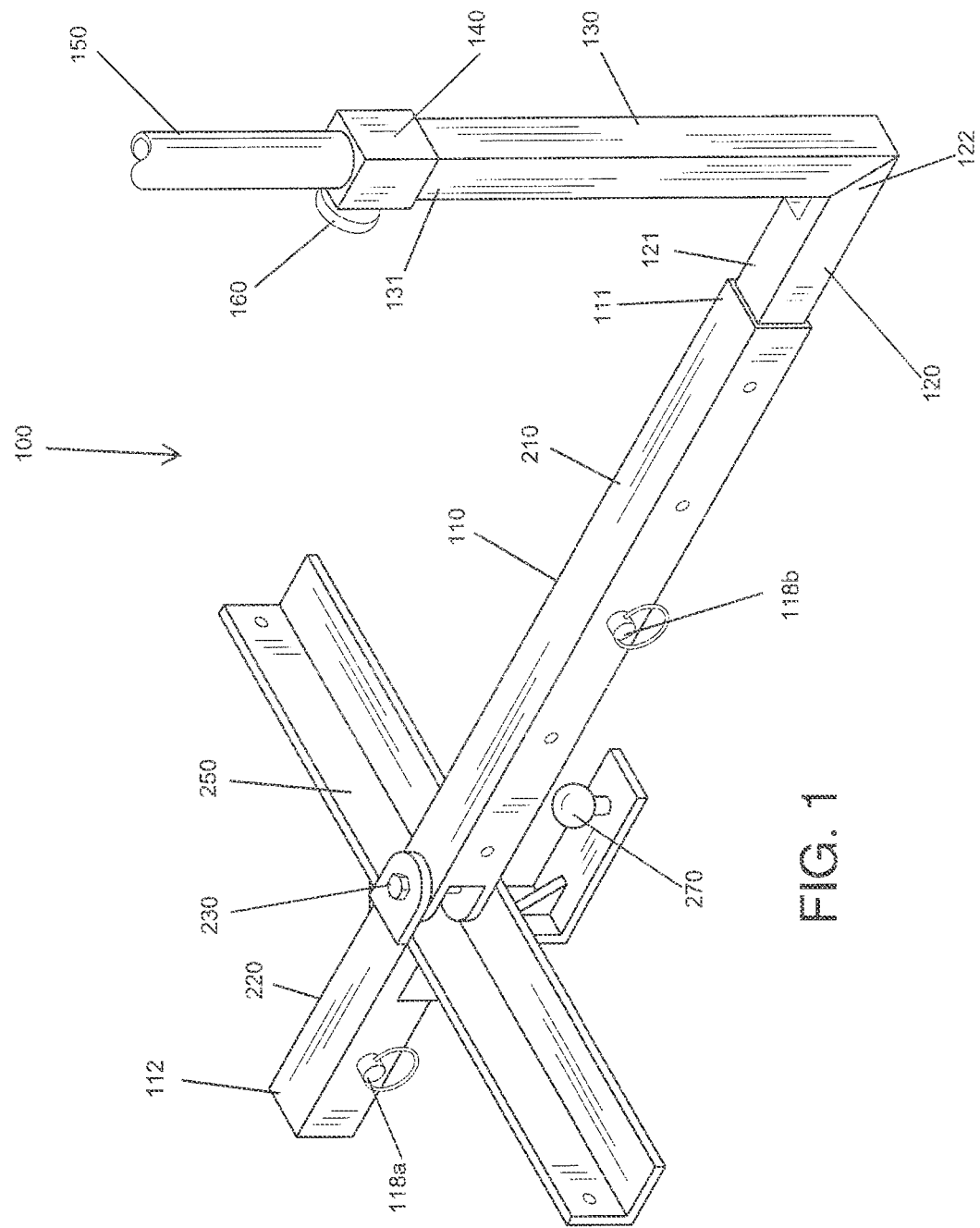
FIG. 1 is a perspective view of the system of the present invention.

Referring now to FIGS. 1-6, the present invention features a shade system 100 for providing shade. The system 100 comprises a main shaft 110 having a first end 111 and a second end 112. The second end 112 is adapted to engage a hitch receiver 201 on a truck or other vehicle. The second end 112 can be secured to the hitch receiver 201 via a second locking mechanism 118*a* (e.g., a hitch lock pin or other appropriate mechanism).

The main shaft 110 is generally hollow. A telescopic arm 120 (the inner end 121) is telescopically received in the first end 111 of the main shaft 110. The telescopic arm 120 can be secured in a particular desired position via a first locking mechanism 118*b* (e.g., a lock pin or other appropriate mechanism).

A vertical shaft 130 extends upwardly from the telescopic arm 120 (e.g., at or near the outer end 122). In some embodiments, the vertical shaft 130 is at an angle, e.g., about 90 degrees, with respect to the telescopic arm 120.

An umbrella holder 140 is disposed on the top end 131 of the vertical shaft 130. The umbrella holder 140 is adapted to receive an umbrella shaft 150. Umbrella shafts of umbrellas 101 are well known to one of ordinary skill in the art. The umbrella shaft 150 can slide upwardly and downwardly through the umbrella holder 140. When a desired height of the umbrella shaft 150 is achieved, the umbrella holder 140 can secure the umbrella shaft 150 in place via an umbrella locking mechanism 160. Such locking mechanisms are well known to one of ordinary skill in the art.

Figure 5:
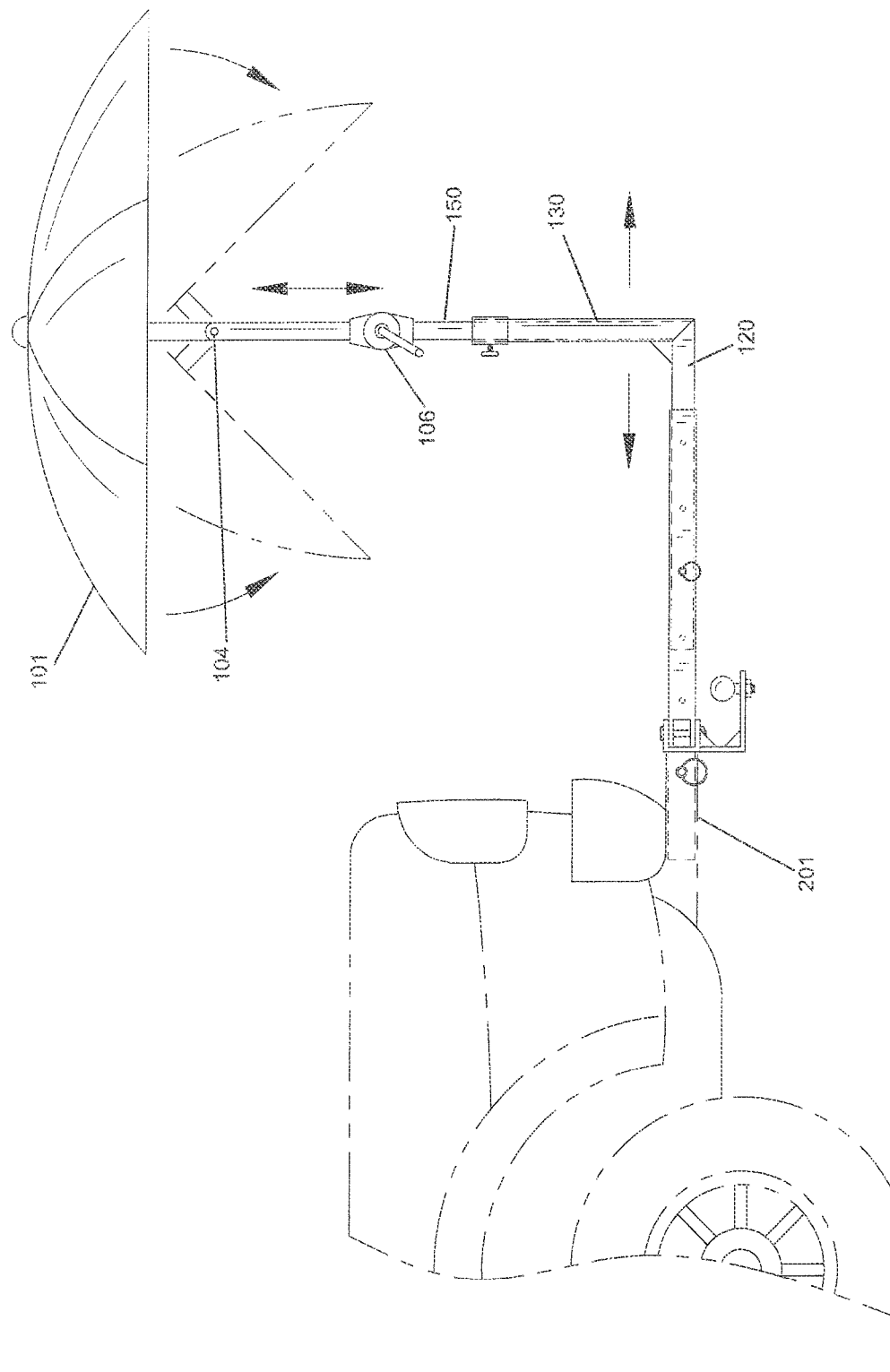
FIG. 5 is a first in-use view of the system of the present invention.
Figure 6:
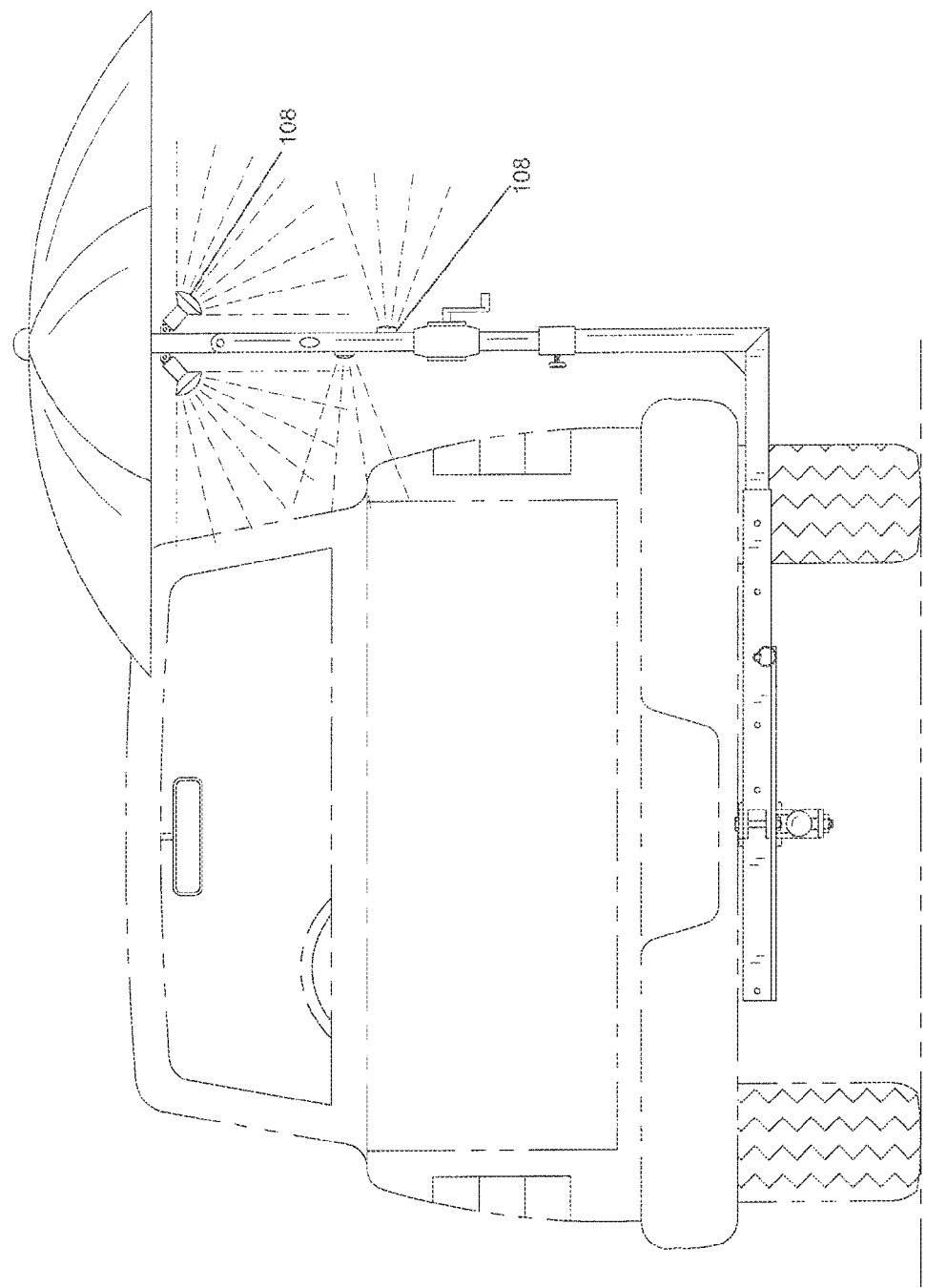
FIG. 6 is a second in-use view of the system of the present invention.

As shown in FIG. 5, in some embodiments, the umbrella 101 may comprise a tilt pivot 104, allowing it to pivot to an appropriate position. Such tilt pivots 104 are well known to one of ordinary skill in the art. As shown in FIG. 6, in some embodiments, the umbrella 101 comprises one or more lights 108 (e.g., disposed on the umbrella shaft 150). In some embodiments, the lights 108 are light emitting diodes (LEDs). In some embodiments, the lights 108 are adjustable. In some embodiments, the umbrella 101 comprises a crank 106 for raising or lowering the umbrella canopy. Such cranks are well known to one of ordinary skill in the art. In some embodiments, the system 100 further comprises cup holders. In some embodiments, the lights 108 can be operatively connected to the vehicle's electrical system.

The main shaft 110 is divided into a first half 210 and a second half 220, the first half 210 comprising the first end 111 and the second half 220 comprising the second end 112. The first half 210 and the second half 220 are connected via a pivot component 230. The pivot component 230 allows the first half 210 to pivot to the first side and to the second side with respect to the second half 220 (e.g., see FIG. 2).

A barrier bar 250 extends outwardly to the first side and to the second side of the main shaft 110 at the pivot component 230. For example, the barrier bar 250 extends outwardly from the main shaft 110 at the pivot component 220 such that the barrier bar 250 is generally perpendicularly to the second half 220 of the main shaft 110. As viewed from the top (with the main shaft 110 not pivoted), the system 100 appears to have a plus-sign shape. The barrier bar 250 is adapted to prevent the first half 210 of the main shaft 110 from pivoting too far to the first side or the second side.

Extending downwardly from the main shaft 110 (at the pivot component 230 region) is a flange 260. Disposed on the flange 260 is a hitch ball 270. Hitch balls are well known to one of ordinary skill in the art. The flange 260 and hitch ball 270 provide the user a means of towing a trailer or other item in a standard manner.

In some embodiments, a first gusset 280*a* is disposed between the main shaft 110 or pivot component 230 and the flange 260. In some embodiments, a second gusset 280*b* is disposed between the vertical shaft 130 and the telescopic arm 120.

The system 100 of the present invention may be constructed in a variety of sizes, shapes, styles, and designs.

As used herein, the term "about" refers to plus or minus 10% of the referenced number. For example, an embodiment wherein the main shaft 110 is about 5 feet in length includes a main shaft 110 that is between 4.5 and 5.5 feet in length.

The disclosures of the following U.S. Patents are incorporated in their entirety by reference herein: U.S. Design Pat. No. D306093; U.S. Pat. No. 5,857,741; U.S. Pat. No. 6,082,269; U.S. Pat. No. 6,189,458; U.S. Pat. No. 6,511,088; U.S. Pat. No. 6,722,380.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A shade system 100 comprising:
   (a) a main shaft 110 having a first end 111 and a second end 112, the second end 112 is adapted to engage a hitch receiver 201 on a vehicle, the main shaft 110 is divided into a first half 210 and a second half 220, the first half 210 comprising the first end 111 and the second half 220 comprising the second end 112, the first half 210 and the second half 220 are connected via a pivot component 230, wherein the pivot component 230 allows the first half 210 to pivot to a first side and to a second side with respect to the second half 220 of the main shaft 110;
   (b) a telescopic arm 120 telescopically received in the first end 111 of the main shaft 110, the telescopic arm 120 can be secured in a particular desired position via a first locking mechanism 118b;
   (c) a vertical shaft 130 extending upwardly from the telescopic arm 120, an umbrella holder 140 being disposed on a top end 131 of the vertical shaft 130, an umbrella 101 having an umbrella shaft 150 being received in the umbrella holder and can slide upwardly and downwardly through the umbrella holder 140 and can be secured in a position via an umbrella locking mechanism 160;
   (d) a barrier bar 250 extending outwardly from the main shaft 110 at the pivot component 230, the barrier bar 250 is generally perpendicularly to the second half 220 of the main shaft 110, the barrier bar 250 is adapted to prevent the first half 210 of the main shaft 110 from pivoting too far to the first side or the second side with respect to the second half 220 of the main shaft 110; and
   (e) a flange 260 extending downwardly from the pivot component of the main shaft 110, and a hitch ball 270 being disposed on the flange 260; and
   wherein the umbrella 101 comprises a crank 106.

2. The shade system 100 of claim 1, wherein a first gusset 280a is disposed between the main shaft 110 and the flange 260.

3. The shade system 100 of claim 1, wherein a second gusset 280b is disposed between the vertical shaft 130 and the telescopic arm 120.

4. The shade system 100 of claim 1, wherein the umbrella 101 comprises a tilt pivot 104.

5. The shade system 100 of claim 1, wherein the umbrella 101 comprises a light 108.

* * * * *